United States Patent Office 3,083,545
Patented Apr. 2, 1963

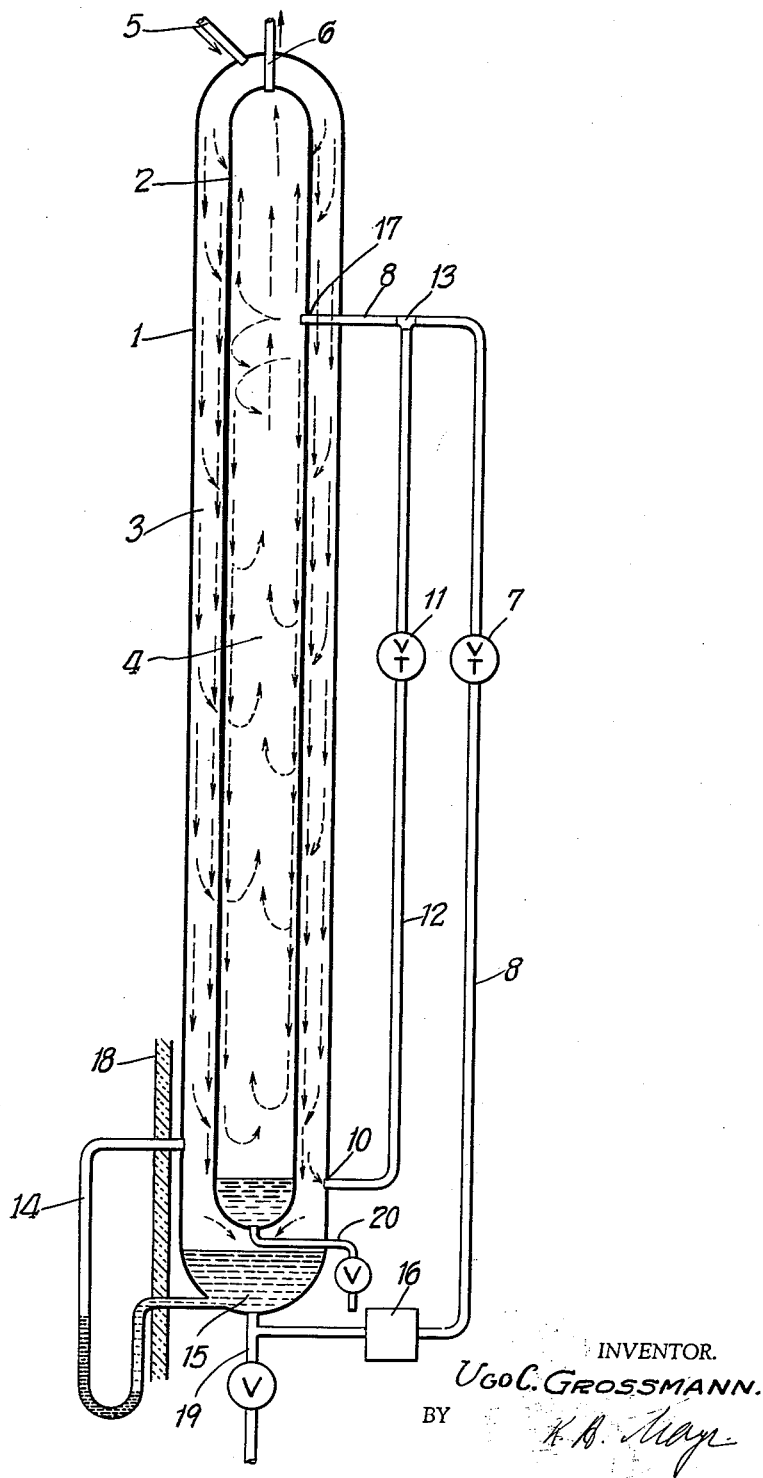

3,083,545
METHOD FOR PURIFYING GASES
Ugo C. Grossmann, Bartlesville, Okla., assignor to Sulzer Frères, S.A., Winterthur, Switzerland, a corporation of Switzerland
Filed Sept. 24, 1958, Ser. No. 763,049
3 Claims. (Cl. 62—34)

The present invention relates to a method for purifying gases.

In the method according to the invention at least a portion of the gas to be purified is condensed in the primary conduit of a heat exchanger whereupon the fluid is removed from the primary conduit and throttled for reducing the pressure of the fluid. The throttled fluid is introduced into a secondary conduit of the same heat exchanger which conduit is in heat exchange relation with the primary conduit. The liquid portion of the fluid flowing downward on the heat exchanger surface of the secondary conduit is re-evaporated in the secondary conduit by the heat of condensation of the fluid condensing in the primary conduit of the heat exchanger. Impurities to be removed from the gas accumulate at the bottom of the secondary conduit.

The apparatus for performing the method according to the invention includes a heat exchanger having a primary conduit and a secondary conduit which are in heat exchange relation and which are interconnected by means of a pipe in which a throttling device is interposed. The pipe is preferably connected to a low portion of the primary conduit and to an upper portion of the secondary conduit.

With the method according to the invention gases can be very extensively freed from foreign substances, particularly from foreign gases in the solid state. The method and apparatus are also suitable for removing impurities which are left over after the gas has been purified in a main purification apparatus. Such a supplemental and complete purification is, for example, always required if the impurities may cause explosions, for example, if oxygen rests are present during the distillation of hydrogen to concentrate hydrogendeuteride or if the impurities come in contact, during the subsequent treatment of the gas, with sensitive fittings or capillaries on which they may freeze and disturb the operation of these elements.

With the method according to the invention ultimate residues of foreign gases are removed because the liquid gases containing the foreign substances in the solid state are gradually evaporated when flowing down in the secondary conduit of the heat exchanger so that all or almost all of the fluid to be purified is evaporated. Only the evaporated portions are removed from the top of the secondary conduit for further use whereas the solid foreign substances accumulate at the bottom of the secondary conduit. Minor, liquid portions of the gas to be purified may be removed together with the foreign substances. These liquid portions, which are lost, together with the foreign substances are removed from time to time from the purification apparatus, for example, by thawing and evaporation or by rinsing.

In a modification of the method according to the invention the gas to be purified is only partly condensed and the condensate and the gaseous portion are separately removed from the primary conduit and separately throttled whereupon the throttled portions are mixed and jointly introduced into the secondary conduit of the heat exchanger. In the apparatus for performing this modified method a pipe is arranged in parallel relation with respect to the fluid flow to the pipe connecting the primary and secondary conduits of the heat exchanger and a throttling device is also interposed in this additional pipe. The additional pipe is connected with the primary conduit at a higher elevation than the connection of the first pipe and terminates in the first pipe downstream of the throttling device in the first pipe. This makes it possible to condense only a portion of the gases to be purified and passing through the primary conduit. The condensed portion is conducted through the first pipe which is connected with the bottom of the primary conduit and the uncondensed portion is conducted through the second pipe which is connected with the primary conduit above the condensate level. By condensing only a portion of the gas to be purified the size and the thermodynamic losses of the heat exchanger can be reduced.

Partial condensation of the gas to be purified in the primary conduit is sufficient, particularly if it is possible that very fine solid impurities enter the apparatus with the gas to be purified. A major portion of these impurities will settle on the condensate film on the interior surface of the primary conduit, if the gas is conducted along a sufficiently large area of the damp condensation surface.

It is advisable to connect a differential pressure indicator, known in the trade as a Hampsometer, with the lower part of the primary conduit of the heat exchanger and with an upper part of the primary conduit. This permits observation of the difference of the pressures of the condensed and of the uncondensed portion of the gas in the primary conduit which pressure difference is proportionate to the static pressure or height of the condensate in the condensate collecting space of the primary conduit. In this way the existence of the desired liquid in the lower part of the primary conduit can be ascertained. Thereupon the flow area of the throttling devices can be so adjusted that a liquid level can just be observed in the liquid accumulating space of the primary conduit.

The purified gas leaves the apparatus at a somewhat lower pressure than the pressure of the gas entering the apparatus. The enthalpy of the gas remains substantially the same during the purification process.

The novel features which are considered characteristic of the invention are set forth with particularity in the appended claims. The invention itself, however, and additional objects and advantages thereof will best be understood from the following description of embodiments thereof when read in connection with the accompanying drawing, the one FIGURE of which is a diagrammatic illustration of an apparatus for performing the method according to the invention.

Referring more particularly to the drawing, numerals 1 and 2 designate two substantially vertical pipes placed one within the other. These pipes may be several feet, for example, 18 feet long. The space 3 between the pipe 1 and the pipe 2 forms the primary conduit of a heat exchanger, the space 4 within the pipe 2 forming the secondary conduit of the heat exchanger. An inlet pipe 5 is connected with the upper part of the primary conduit 3. An outlet pipe 6 is connected wiht the upper part of the secondary conduit 4. The lower end 9 of the primary conduit is connected by means of a pipe 8 with the secondary conduit 4. A filter 16 and an adjustable throttling device 7 are interposed in the pipe 8. The latter terminates at 17 in the upper portion of the secondary conduit, in the illustrated example, at about three quarters of the total height of the apparatus. A pipe 12 is connected at 10 with the primary conduit about the connection of the pipe 8 with the primary conduit. The pipe 12 terminates in the pipe 8 at 13 downstream of the throttling device 7. An adjustable throttling device 11 is interposed in the pipe 12.

A pressure differential indicator or Hampsometer 14, whose temperature is maintained at that of the locality in which the apparatus is placed, is connected with the lower portion of the primary conduit 3, a heat insulating wall 18 separating the apparatus from the environment.

The apparatus operates as follows:

A gas, for example, hydrogen is introduced through the inlet conduit 5 into the primary conduit 3 of the heat exchanger. The gas is at a condition which is at or slightly above its liquefaction condition, i.e., 24.6° Kelvin and 3 atmospheres absolute in the case of the hydrogen. The previously prepurified hydrogen still contains traces of, for example, nitrogen, oxygen, or carbon monoxide which substances may be in the gas state or in the solid state. The foreign substances, inasmuch as they are in the solid state, are mechanically carried along by the gas steam. Upon descent in the conduit 3 a portion of the gas condenses on the outside wall of the interior tube element 2 and flows towards and collects in the lower part 15 of the primary conduit, carrying along solid foreign substances. The liquid fluid together with the solid matter suspended therein are conducted through the pipe 8, the coarser solid parts being partly retained in a filter 16 interposed in the pipe 8. For removing greater concentrations of foreign matter a blowdown pipe 19 may be connected with the bottom of the pipe 1. The liquid level at the bottom 15 of the tube element 1 is observed by means of the Hampsometer 14.

After passing through the throttling device 7 the fluid has a pressure of, for example, 2.0 to 2.5 atmospheres absolute and a temperature of, for example, 23.7° Kelvin. The uncondensed portion of the fluid leaves the primary conduit 3 at 10 and passes through the pipe 12 and, after pressure reduction in the throttling device 11, is mixed at 13 with the fluid flowing through the conduit 8 whereupon the mixture is directed against the interior wall of the tube element 2, enclosing the secondary conduit 4. The fluid now flows downward in the secondary conduit 4, forming a trickling film on the inner wall of the tube 2 whereby the fluid to be purified gradually evaporates due to the heat developed by the condensation taking place in the conduit 3. During this evaporation foreign substances accumulate in the bottom of the conduit 4 in solid form and may be removed from time to time through a blow-down connection 20 or by thawing and evaporation. The purified gas leaves the apparatus through the outlet 6 which is connected to the top of the tube element 2.

The greater the portion of the uncondensed fluid which is conducted through the pipe 12 is in relation to the condensed portion flowing through the pipe 8, the more can the size of the heat exchanger and temperature and pressure difference needed for sufficient condensation be reduced. As has been explained before, the liquid film in the primary conduit 3 which is produced by suitable condensation is particularly desirable because the solid foreign substances flowing downward with the gas come in contact on a large liquid surface with the liquid film on the outer wall of the tube element 2 and are retained by the film.

When purifying a gas which does not partially liquefy during the throttling operation, the connection 17 is not placed on the upper end of the tube element 2 but is located in the upper half of this element, as shown in the drawing, so that the apparatus can be started. During starting operations the portion of the heat exchanger which is above the connection 17 has a counterflow effect, the fluid in the conduit 3 flowing downward and in the conduit 4 flowing upward above the connection 17. If the portion above the connection 17 is sufficiently high, condensate appears first in the upper part of the conduit 3, depending on the pressure and temperature conditions of the fluids entering through the inlet 5 and leaving through the outlet 6. This liquid film which adheres to the upper portion of the outside of the tube element 2 has the same purifying effect as the film on the outside of the element 2 below the connection 17 during the previously described operation, i.e., solid matter in the gas entering through the inlet 5 will be retained in the liquid film developing on the outside of the element 2. If a gas is purified which partially liquefies when its pressure is reduced by throttling, the connection 17 may be located in the uppermost portion of the element 2.

The pipe 12 may be omitted and all of the fluid introduced through the inlet 5 and completely or partially condensed in the conduit 3 may be removed through the pipe 8. In the latter case observation of the liquid level in the condensate accumulating space 15 of the primary conduit 3 may be omitted and a mixture of liquid and gas may flow simultaneously through the throttling device 7.

The heat exchanger may be designed in any conventional manner, for example, a plurality of parallel tube elements 2 may be arranged within a single tube element 1. The primary conduit may be formed by the inner tube or tubes whereby the outer tube forms a secondary conduit in which a tube terminates which is connected with the lower part of the inner tube or tubes. Instead of tubular elements box-like elements may be used and placed one within the other.

I claim:

1. A method of purifying a gaseous fluid and separating therefrom the higher boiling, solidifiable impurities present therein, which comprises conducting the gaseous fluid through the primary conduit of the heat exchange zones of a heat exchanger in which both the primary and secondary conduits are in direct heat exchange relationship with each other through a common heat exchange wall, condensing at least a portion of the said gaseous fluid in said primary conduit to form a downwardly flowing liquid film of condensate on the heat exchange wall of said primary conduit and to convert at least a part of the higher boiling, solidifiable impurities present in the gaseous fluid being condensed to solid form whereby said downwardly flowing liquid film washes said solidified impurities to the base of the primary conduit, throttling the condensed portion of the fluid together with at least a portion of the solidified impurities contained therein and conducting this mixture into the secondary conduit while throttling any uncondensed portion of the fluid and conducting said throttled uncondensed fluid into and through the secondary conduit of the heat exchanger and causing at least a major part of the liquefied fluid present in the secondary conduit to be vaporized by the heat of condensation of the gaseous fluid condensing in the primary conduit, maintaining a pool of the condensate and impurities contained therein in each of the primary and secondary conduits of said heat exchanger and from time to time removing a part of the retained condensate together with the impurities contained therein from the secondary conduit.

2. A method as defined in claim 1 in which only a portion of the fluid being purified is condensed in the primary conduit, the condensate and the uncondensated portion of the fluid being separately throttled and thereupon conducted into the secondary conduit.

3. A method as defined in claim 2 in which at least part of the solidifiable impurities solidified during condensation of the fluid in the primary conduit is removed from the fluid prior to its introduction into the secondary conduit.

References Cited in the file of this patent

UNITED STATES PATENTS

| | | |
|---|---|---|
| 1,027,862 | Von Linde | May 28, 1912 |
| 1,204,521 | Van Fleet | Nov. 14, 1916 |
| 1,562,915 | Recordon et al. | Nov. 24, 1925 |
| 1,579,348 | Claude | Apr. 6, 1926 |
| 1,963,840 | Frankl | June 19, 1934 |
| 2,017,240 | Frankl | Oct. 15, 1935 |
| 2,142,446 | Kopp | Jan. 3, 1939 |
| 2,256,421 | Borchardt | Sept. 16, 1941 |
| 2,332,201 | Buckley | Oct. 19, 1943 |

(Other references on following page)

UNITED STATES PATENTS

| | | |
|---|---|---|
| 2,501,999 | Fausek | Mar. 28, 1950 |
| 2,502,521 | Dennis | Mar. 28, 1950 |
| 2,528,028 | Barry | Oct. 30, 1950 |
| 2,668,425 | Skaperdas | Feb. 9, 1954 |
| 2,673,456 | Scharmann | Mar. 30, 1954 |
| 2,818,454 | Wilson | Dec. 31, 1957 |
| 2,820,833 | Wilson | Jan. 21, 1958 |
| 2,840,994 | Lobo | July 1, 1958 |
| 2,949,745 | Etienne | Aug. 23, 1960 |